United States Patent
Iapalucci et al.

(10) Patent No.: US 11,588,786 B2
(45) Date of Patent: Feb. 21, 2023

(54) GATEWAY FOR MOBILE TERMINATED WIRELESS COMMUNICATION IN A 5G OR OTHER NEXT GENERATION WIRELESS NETWORK

(71) Applicant: AT&T Intellectual Property I, L.P., Atlanta, GA (US)

(72) Inventors: Mike Iapalucci, Carrollton, TX (US); Myra Agostino, Jefferson, MD (US); Zhi Cui, Sugar Hill, GA (US); Jason Robbins, Birmingham, AL (US); Gregory Stockman, West Chicago, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 300 days.

(21) Appl. No.: 16/700,127

(22) Filed: Dec. 2, 2019

(65) Prior Publication Data

US 2021/0168117 A1 Jun. 3, 2021

(51) Int. Cl.
| | |
|---|---|
| *G06F 9/00* | (2006.01) |
| *G06F 15/16* | (2006.01) |
| *G06F 17/00* | (2019.01) |
| *H04L 9/40* | (2022.01) |
| *G06N 3/08* | (2023.01) |
| *H04W 12/12* | (2021.01) |
| *G06N 3/04* | (2023.01) |
| *H04W 12/03* | (2021.01) |

(52) U.S. Cl.
CPC .......... *H04L 63/0209* (2013.01); *G06N 3/04* (2013.01); *G06N 3/08* (2013.01); *H04L 63/1425* (2013.01); *H04W 12/03* (2021.01); *H04W 12/12* (2013.01)

(58) Field of Classification Search
CPC .......... H04L 63/0209; H04L 63/1425; H04W 12/03; H04W 12/001; H04W 12/12; G06N 3/04; G06N 3/08
USPC .......................................................... 726/12
See application file for complete search history.

(56) References Cited

U.S. PATENT DOCUMENTS

| | | | |
|---|---|---|---|
| 9,922,191 B1* | 3/2018 | Grafi | G06F 21/564 |
| 2016/0219065 A1* | 7/2016 | Dasgupta | H04L 63/1441 |
| 2016/0285717 A1* | 9/2016 | Kim | H04L 41/0631 |

(Continued)

OTHER PUBLICATIONS

"US carriers introduce Project Verify to replace individual app passwords." The Verge, https://www.theverge.com/2018/9/13/17855074/project-verify-passwords-mobile-login-att-sprint-tmobile-verizon, Last Accessed Oct. 31, 2019. 2 pages.

(Continued)

*Primary Examiner* — Jeffrey C Pwu
*Assistant Examiner* — Samuel Ambaye
(74) *Attorney, Agent, or Firm* — Amin, Turocy & Watson, LLP

(57) ABSTRACT

According to one or more embodiments, a system can comprise a processor and a memory that can store executable instructions that, when executed by the processor, facilitate performance of operations. The operations can include establishing a wireless connection to a wireless network. The operations can further include receiving, via the wireless connection, data from a gateway device, that has been communicated via a network device of a publicly accessible network, wherein the data has been compared, by the gateway device, to a template of anomalous activity.

20 Claims, 10 Drawing Sheets

(56) References Cited

U.S. PATENT DOCUMENTS

2017/0006030 A1* 1/2017 Krishnamoorthy ... H04L 9/3263
2019/0130306 A1* 5/2019 Singh .................... G06N 20/00
2020/0267176 A1* 8/2020 Asher ................. H04L 63/0263

OTHER PUBLICATIONS

"Best practice to authenticate 2 machines in a M2M environment." Stack Overflow, https://stackoverflow.com/questions/19208901/best-practice-to-authenticate-2-machines-in-a-m2m-environment, Last Accessed Oct. 31, 2019. 3 pages.

* cited by examiner

GATEWAY FOR MOBILE TERMINATED WIRELESS COMMUNICATION IN A 5G OR OTHER NEXT GENERATION WIRELESS NETWORK

TECHNICAL FIELD

The subject application is related to communication networks, and, for example, to network gateways in advanced networks, such as in a fifth generation (5G) network or beyond.

BACKGROUND

With the increase in the use of 5G and other modern networks comes an increase in the need for authentication of communications between devices. This can be especially important for communications received from the Internet, which, as a publicly accessible network source, can render devices receiving the communication vulnerable to data mining and increased security risks, including malware, botnets, and DDoS (Distributed Denial of Service) attacks. One type of device that can be vulnerable to these issues are devices that are sometimes termed Internet of Things (IoT) devices. e.g., refrigerators, surveillance cameras, thermostats, and control systems. These devices may not have the latest security technologies included within their operating software, or may not be securely configured by default.

When devices are connected to publicly accessible network sources via a wide area network (WAN), such as a wireless communication network, a network provider can, in many circumstances, provide additional protection for these devices. With wireless networks problems can occur however, because of the variety of different devices that can be connected and the mobility of devices. Also, often devices often cannot implement additional protections natively because of outdated or sparse hardware or software limitations, e.g., IoT devices especially, have these issues. Another issue with IoT devices is that, while these devices can be connected to a network that could provide enhanced security, because of limited capabilities, the devices may not be able to receive updates for many reasons, making them vulnerable to modern attacks in many circumstances.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
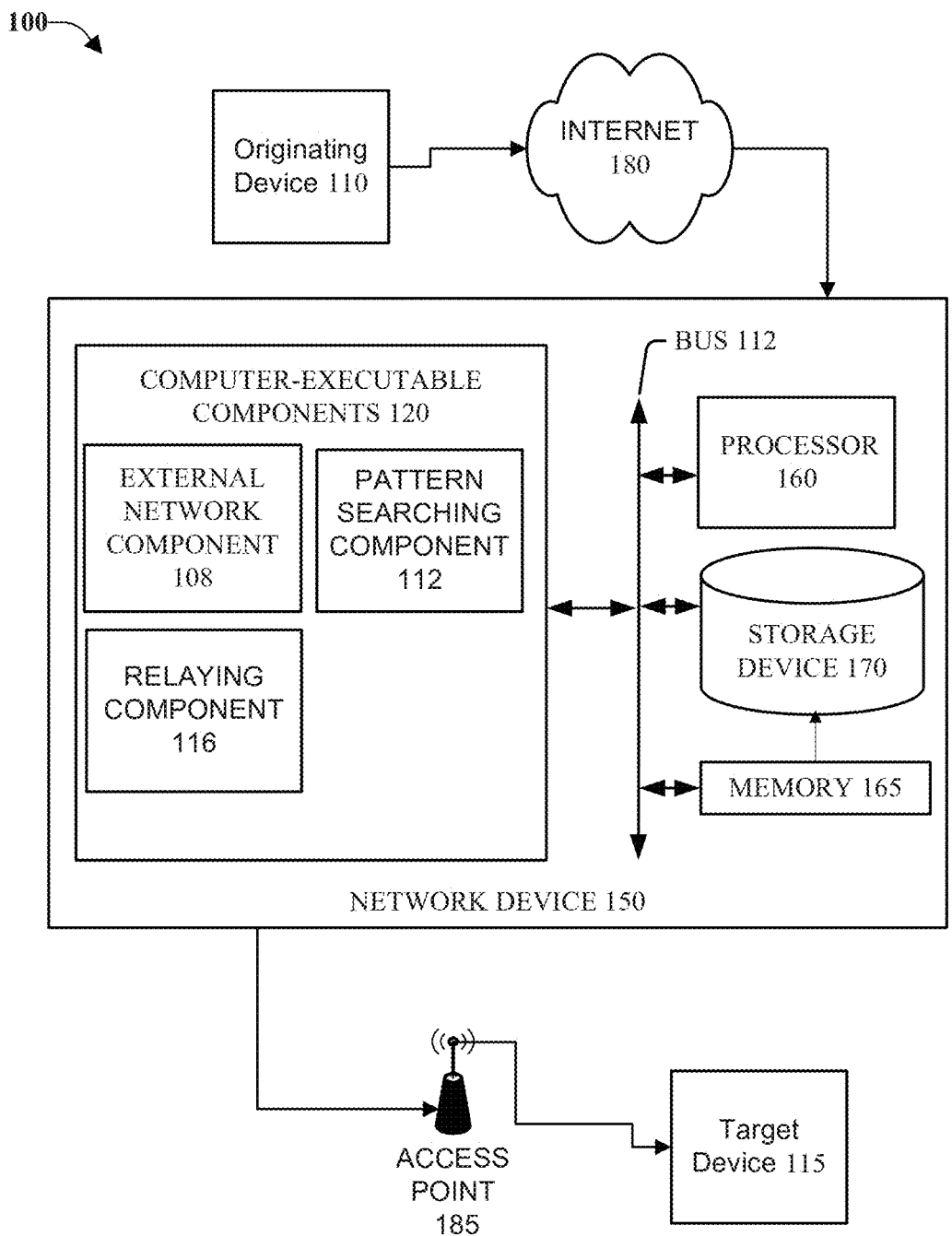
FIG. 1 illustrates a block diagram of an example, non-limiting gateway system that can facilitate providing a gateway for publicly accessible communications to reach devices via a wireless network, in accordance with one or more embodiments described herein.

Generally speaking, one or more embodiments described herein provide mechanisms and signaling to facilitate providing a gateway for publicly accessible communications to reach devices via a wireless network, in accordance with one or more embodiments.

It should be understood that any of the examples and terms used herein are non-limiting. For instance, the examples are based on 5G communications between a UE exemplified as a smartphone or the like and network devices; however virtually any communications devices can benefit from the technology described herein, and/or their use in different spectrums can likewise benefit. Thus, any of the embodiments, aspects, concepts, structures, functionalities or examples described herein are non-limiting, and the technology can be used in various ways that provide benefits and advantages in radio communications in general.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Further, the various embodiments can be implemented as a method, apparatus or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize that many modifications can be made to this configuration without departing from the scope or spirit of the various embodiments.

In addition, one or more embodiments described herein can be directed towards a multi-connectivity framework that supports the operation of New Radio (NR, also termed 5G). As will be understood, one or more embodiments can allow an integration of UEs with network assistance, by supporting control and mobility functionality on cellular links, e.g. Long Term Evolution (LTE) or NR. One or more embodiments can provide benefits including, improved security system robustness, reduced overhead, and global resource management.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology can be used in various ways that provide benefits and advantages in radio communications in general.

In some embodiments the non-limiting term "radio network node" or simply "network node," "radio network device or simply "network device" is used herein. These terms may be used interchangeably, and refer to any type of network node that serves user equipment and/or connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

In some embodiments, the non-limiting term integrated access backhaul (IAB) is used. In Release 16 of the 3rd Generation Partnership Project (3GPP) specification, an IAB framework based on fixed relays is standardized. This Release 16 IAB framework allows for a multi-hop network based on a hierarchical tree architecture. As described further below, in some embodiments, one or more of the non-limiting terms "relay node," "mobile relay node," "anchor node," and "mobile base station" can describe mobile relay nodes supporting a mobile IAB network. It should be appreciated that notwithstanding some descriptions herein referring to concepts of wireless base stations being "fixed," "stationary" or similar terms, and "mobile," "nonfixed" or similar terms, these terms describing a capacity for movement are not limiting, e.g., in different embodiments, a mobile base station described herein can be fixed in position, and vice versa.

In some embodiments the non-limiting term UE is used, and can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UEs 302A-B can also comprise IOT devices that communicate wirelessly.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), fifth generation core (5G Core), fifth generation option 3× (5G Option 3×), high speed packet access (HSPA), Z-Wave, Zigbee and other 802.XX wireless technologies and/or legacy telecommunication technologies.

Some embodiments are described in particular with example implementations in 5G NR systems. The embodiments are however applicable to any radio access technology (RAT) or multi-RAT system where the user equipment operates using multiple carriers, e.g. LTE FDD/TDD, WCMDA/HSPA, GSM/GERAN, Wi-Fi, WLAN, WiMax, CDMA2000, etc.

FIG. 1 illustrates a block diagram of an example, non-limiting gateway system 100 that can facilitate providing a gateway for publicly accessible communications to reach devices via a wireless network, in accordance with one or more embodiments described herein. Repetitive description of like elements and/or processes employed in respective embodiments is omitted for sake of brevity.

In some embodiments, gateway system 100 can comprise network device 150, Internet 180, originating device 110, access point 185, and target device 115. Network device 150 can include processor 160, storage device 170, memory 165, and computer-executable components 120, in accordance with one or more embodiments. Computer executable components 120 can include external network component 108, pattern searching component 112, relaying component 116, and any other components associated with gateway system 100 as disclosed herein. In one or more embodiments, network device 150 can receive a communication from originating device 110 via Internet 180, process the communication, and relay the communication to target device 115 via wireless communication with access point 185.

According to multiple embodiments, network device 150 includes memory 165 that can store one or more computer and/or machine readable, writable, and/or executable components and/or instructions that, when executed by processor 160, can facilitate performance of operations defined by the executable component(s) and/or instruction(s). For example, memory 165 can store computer executable components that can, when executed by processor 160, execute the components depicted in the drawings and described herein.

In some embodiments, memory 165 can comprise volatile memory (e.g., random access memory (RAM), static RAM (SRAM), dynamic RAM (DRAM), etc.) and/or non-volatile storage 170 (e.g., read only memory (ROM), programmable ROM (PROM), electrically programmable ROM (EPROM), electrically erasable programmable ROM (EEPROM), etc.) that can employ one or more memory architectures. Further examples of memory 165 are described below with reference to system memory 1016 and FIG. 10. Such examples of memory 165 can be employed to implement any embodiments of the subject disclosure.

According to multiple embodiments, processor 160 can comprise one or more processors and/or electronic circuitry that can implement one or more computer and/or machine readable, writable, and/or executable components and/or instructions that can be stored on memory 165. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more of a central processing unit, a multi-core processor, a microprocessor, dual microprocessors, a microcontroller, a System on a Chip (SOC), an array processor, a vector processor, and/or another type of processor. Further examples of processor 160 are described below with reference to processing unit 1014 of FIG. 10. Such examples of processor 160 can be employed to implement any embodiments of the subject disclosure.

In some embodiments, elements of gateway system 100, including, but not limited to memory 165, processor 160, external network component 108, pattern searching component 112, relaying component 116, and/or another component of gateway system 100 as described herein, can be communicatively, electrically, and/or operatively coupled to one another via bus 112 to perform functions of gateway system 100, and any other components coupled therewith. In several embodiments, bus 112 can comprise one or more of a memory bus, memory controller, peripheral bus, external bus, local bus, or another type of bus that can employ various bus architectures. Further examples of bus 112 are described below with reference to system bus 1008 and FIG. 10. Such examples of bus 112 can be employed to implement any embodiments of the subject disclosure.

In some embodiments, gateway system 100 can comprise any type of component, machine, device, facility, apparatus, and/or instrument that comprises a processor and/or can be capable of effective and/or operative communication with a wired and/or wireless network. All such embodiments are envisioned. For example, gateway system 100 can comprise a server device, a computing device, a general-purpose computer, a special-purpose computer, a quantum computing device (e.g., a quantum computer, a quantum processor, etc.), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, gateway system 100 can be coupled (e.g., communicatively, electrically, operatively, etc.) to one or more external systems, sources, and/or devices (e.g., computing devices, communication devices, etc.) via a data cable (e.g., coaxial cable, High-Definition Multimedia Interface (HDMI), recommended standard (RS) 232, Ethernet cable, etc.). In some embodiments, gateway system 100 can be coupled (e.g., communicatively, electrically, operatively, etc.) to one or more external systems, sources, and/or devices (e.g., computing devices, communication devices, etc.) via network 180.

According to multiple embodiments, network 180 can comprise wired and wireless networks, including, but not limited to, a cellular network, a wide area network (WAN) (e.g., the Internet) or a local area network (LAN). For example, gateway system 100 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, gateway system 100 can thus include hardware (e.g., a central processing unit (CPU), a transceiver, a decoder), software (e.g., a set of threads, a set of processes, software in execution) or a combination of hardware and software that facilitates communicating information between gateway system 100 and external systems, sources, and/or devices (e.g., computing devices, communication devices, etc.).

According to multiple embodiments, gateway system 100 can comprise one or more computer and/or machine readable, writable, and/or executable components and/or instructions that, when executed by processor 160, can facilitate performance of operations defined by such component(s) and/or instruction(s). Further, in numerous embodiments, any component associated with gateway system 100, as described herein with or without reference to the various figures of the subject disclosure, can comprise one or more computer and/or machine readable, writable, and/or executable components and/or instructions that, when executed by processor 160, can facilitate performance of operations defined by such component(s) and/or instruction(s). For example, external network component 108, pattern searching component 112, relaying component 116, and any other components associated with gateway system 100 as disclosed herein (e.g., communicatively, electronically, and/or operatively coupled with and/or employed by gateway system 100), can comprise such computer and/or machine readable, writable, and/or executable component(s) and/or instruction(s). Consequently, according to numerous embodiments, gateway system 100 and/or any components associated therewith as disclosed herein, can employ processor 160 to execute such computer and/or machine readable, writable, and/or executable component(s) and/or instruction(s) to facilitate performance of one or more operations described herein with reference to gateway system 100 and/or any such components associated therewith.

For example, in one or more embodiments, external network component 108 can facilitate, by network device 150 comprising a processor 160, receiving a communication from originating device 110 for target device 115 from network device 150 associated with a publicly accessible network, e.g., the Internet. After receipt by network device 150 (e.g., by external network component 108) network device 150 can employ comparing, e.g., by employing pattern searching component 112, the received communication with a previously received communication from originating device 110. In one or more embodiments, as discussed below, pattern searching component 112 can search for a pattern of activity that can indicate that the communication should be subject to additional operations, discussed below. In one or more embodiments, in some circumstances, sending, by relaying component 116 of gateway device 150, the communication to target device 115 based on the search for the pattern of activity.

In some embodiments, gateway system 100 can be associated with various technologies. For example, gateway system 100 can be associated with classical computing technologies, quantum computing technologies, classical reinforcement learning technologies, quantum reinforcement learning technologies, classical artificial intelligence (AI) model technologies, quantum AI model technologies, classical machine learning (ML) model technologies, quantum ML model technologies, cloud computing technologies, IoT technologies, and/or other technologies.

As used in this disclosure, in some embodiments, the terms "component," "system" and the like are intended to refer to, or comprise, a computer-related entity or an entity related to an operational apparatus with one or more specific functionalities, where, for example, the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution, and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

It should also be appreciated that the embodiments of the subject disclosure depicted in various figures disclosed herein are for illustration only, and as such, the architecture of such embodiments are not limited to the systems, devices, and/or components depicted therein. For example, in some embodiments, network device 150 can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

Figure 2:
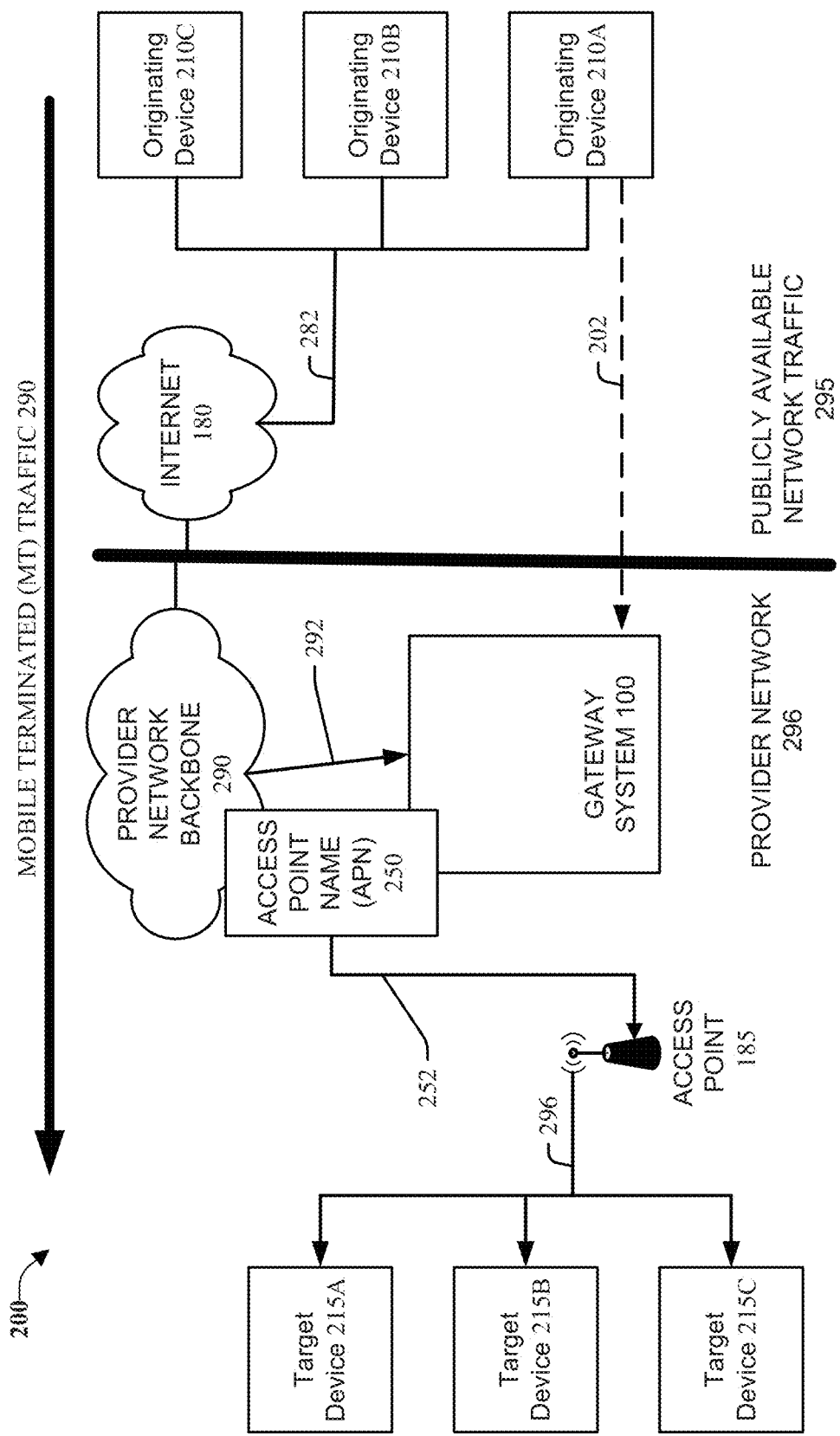
FIG. 2 illustrates a block diagram of an example, non-limiting system that can facilitate providing a gateway for publicly accessible communications to reach devices via a wireless network, in accordance with one or more embodiments described herein.

FIG. 2 illustrates a block diagram of an example, non-limiting system 200 that can facilitate providing a gateway for publicly accessible communications to reach devices via a wireless network, in accordance with one or more embodiments described herein. Repetitive description of like elements and/or processes employed in respective embodiments is omitted for sake of brevity.

In some embodiments, system 200 can comprise gateway system 100, internet 180, provider network backbone 290, originating devices 210A-B, access point 185, and target devices 215A-C. In this example, target devices 215A-C are wirelessly coupled to access point 185 by wireless connection 296, and access point is communicatively coupled to provider network backbone 290 and gateway system 100 by connection 252 to access point name (APN) 250.

In one or more embodiments, an APN can be a unique identifier that can facilitate connection (e.g., by target device 215A) to provider network backbone 290. In one or more embodiments, the APN can be the exit point from the 3G or GPRS network into either the public Internet or a private customer gateway. Considered in greater detail, in some implementations, APN 250 can be a configurable network identifier used by a mobile device to facilitate connecting to a GSM carrier. The carrier can use this identifier to determine what type of network connection should be created. For example, given a connection through APN 250, an IP addresses can be selected and assigned to the wireless, security methods can be implemented for the connection, and a connection to a private customer network can be facilitates. More specifically, APN 250 can identify an IP Packet Data Network (PDN), that is selected for communication by a mobile data user.

In addition to identifying a PDN, APN 250 can also facilitate identifying data access services provided by the PDN that can be associated with a user account associated with a device, e.g., a wireless application protocol (WAP) server service, multimedia messaging service (MMS). In different implementations, APN 250 can be used in 3GPP data access networks, e.g. general packet radio service (GPRS), EDGE, 2G, 3G, 4G, 5G, and evolved packet core (EPC) networks. In 5G implementations, a logical network name similar to APN 250 can be termed a data network name (DNN), and this name can also be a logical name to which a device can request connectivity. FIG. 2 depicts this use of APN 250 as an identifier for to facilitate connections to provider network backbone 290 by overlaying APN 250 on a portion of provider network backbone 290.

With respect to one or more embodiments described herein, APN 250 can also provide a logical name to which target device 215A can request a connection to provider network backbone 290 via gateway system 100. To depict this use of APN 250 by one or more embodiments, in FIG. 2, APN 250 is also depicted as overlaying a portion of gateway system 100. Thus, in one or more embodiments, by referencing APN 250, target devices 215A-C can establish connectivity with provider network backbone 290 with one or more of the protective features provided by gateway system 100. As depicted in FIG. 2, the positioning of gateway system 100 between APN 250 and provider network backbone 290 can be termed a carrier network side implementation of gateway system 100. In alternative embodiments depicted with FIG. 3 below, gateway system 100 can be deployed between APN 250 and target devices 215A-C, with this arrangement referred to as an edge deployment.

Returning to the example of FIG. 2, in one or more embodiments, gateway system 100 can receive network communications from originating devices 210A-C via provider network backbone 290 and internet 180. Both provider network backbone 290 and gateway system 100 can provide communications from internet 180 to target devices 215A-C via APN 250 and access point 185. Generally speaking, system 200 depicts traffic that originates with originating devices 210A-C, from internet 180, and ends with communications delivered to target devices 215A-C, e.g., as depicted by mobile terminated (MT) traffic 290 arrow.

In one or more embodiments of system 200, gateway system 100 can receive a communication for target device 210A from a network device (e.g., gateway system 100), as a system associated with a publicly accessible network source, e.g., connected via provider network backbone 290 to internet 180. It should further be noted that, in one or more embodiments, a connection can be established between originating device 210A and gateway device 100.

As described above, gateway system 100 can compare the communication with a previously received communication from the network device associated with the publicly accessible network source to search for a pattern of activity. In one or more embodiments, other sources of archived and real-time data can be analyzed in the pattern analysis performed by pattern searching component 112 of gateway 100. Different combinations of data sources and analysis that can be used by one or more embodiments as discussed in more detail below with FIG. 4.

In one or more embodiments, after the analysis above, gateway system 100 can relay the communication to the target device 215A based on the results of the analysis, e.g., communication determined to be appropriate to relay to target device 210A. As noted above as depicted in FIG. 2, in this example, gateway system 100 is positioned between publicly accessible Internet 180 data sources and APN 250. In one or more embodiments, sending the communication to the device comprises sending, via APN 250 the communication to a device from which the target device receives the communication.

As noted above, IoT devices can provide an example of a type of device that can benefit from combinations of different features of one or more embodiments. For example, many IoT devices are specifically designed for particular functions, without many of the security functions associated with mobile devices and other network connected devices. Because of this, different embodiments described herein that can provide higher levels of security can often be a useful security supplement for IoT devices. Example security features discussed below include, as discussed with FIG. 4 below, analysis over time of patterns of data including, but not limited to, network traffic, operations by different types of originating devices 210A-C and target devices 215A-C. In addition, as discussed with FIG. 5 below, one or more embodiments can employ artificial intelligence components to augment the pattern analysis operations of other components. Machine learning concepts can also augment the updating and improving of the results of embodiments over time.

Other example characteristics of IoT devices that can be served by one or more embodiments include the mobility profile of some IoT devices. For example, some approaches to network security differentiate between stationary devices and mobile devices, e.g., servers and user equipments, respectively, and one or more embodiments also can serve these devices. IoT devices can have, in some circumstances, mobility profiles with combinations of characteristics of both mainly stationary and mainly mobile of devices.

As noted above IoT devices can often be adapted to specific functions, and access to these devices from publicly available networks can be sought for a variety of purposes, including but not limited to, setting up and updating configuration information, changing the reporting frequency of the device, and changing the data payload of the device. Different examples include changing a temperature setting for a wirelessly connected thermostat, and changing triggering parameters of wirelessly connected camera. Many of the access requirements of different IoT devices can require access from outside a protected network, e.g., a publicly accessible IP address.

In another example of one or more embodiments described herein augmenting features of IoT devices, to facilitate control of an IoT device often the device will have a capability to present a user interface for configuration. A web page for controlling and IoT device can be publicly available to the internet, with password authentication. In this example, the web page can, in some circumstances, not be deployed with modern authentication technologies. In one or more embodiments, by placing gateway system 100 between this web page and the internet, gateway system 100 can provide additional levels of authentication, e.g., multi-factor authenticated access, including, but not limited to, OAath 2.0, or similar authentication protocols, as well as imposing time limits on authentication processes.

In another example of characteristics of IoT devices that can be complemented with features of one or more embodiments, IoT devices often have no encrypted communication capability, or older less secure encryption capabilities. In an operation similar to the supplemental authentication for IoT devices described above, gateway service can provide encryption and decryption services for communications passing through. It should be noted that the encryption functions that can be provided by gateway 100 can be used to supplement existing security features of the IoT device. For example, one or more embodiments can provide enhanced features that include, but are not limited to, expanding the length of encryption keys, providing new encryption algorithms, and providing enhanced versions of transport layer security (TLS).

In addition, in one or more embodiments, system 100 can also provide management and reporting features that can include, but are not limited to, enabling features, disabling features, imposing data limits, geofencing, and more. Further to these administrative functions, it would be appreciated by one having skill in the relevant art(s), given the description herein, that one or more embodiments can provide a device management portal that can be used to modify many of the different configuration settings described herein. This type of self-service by IoT managers can be applied to individual devices, as well as devices that can be grouped together into administrative groups.

Figure 3:
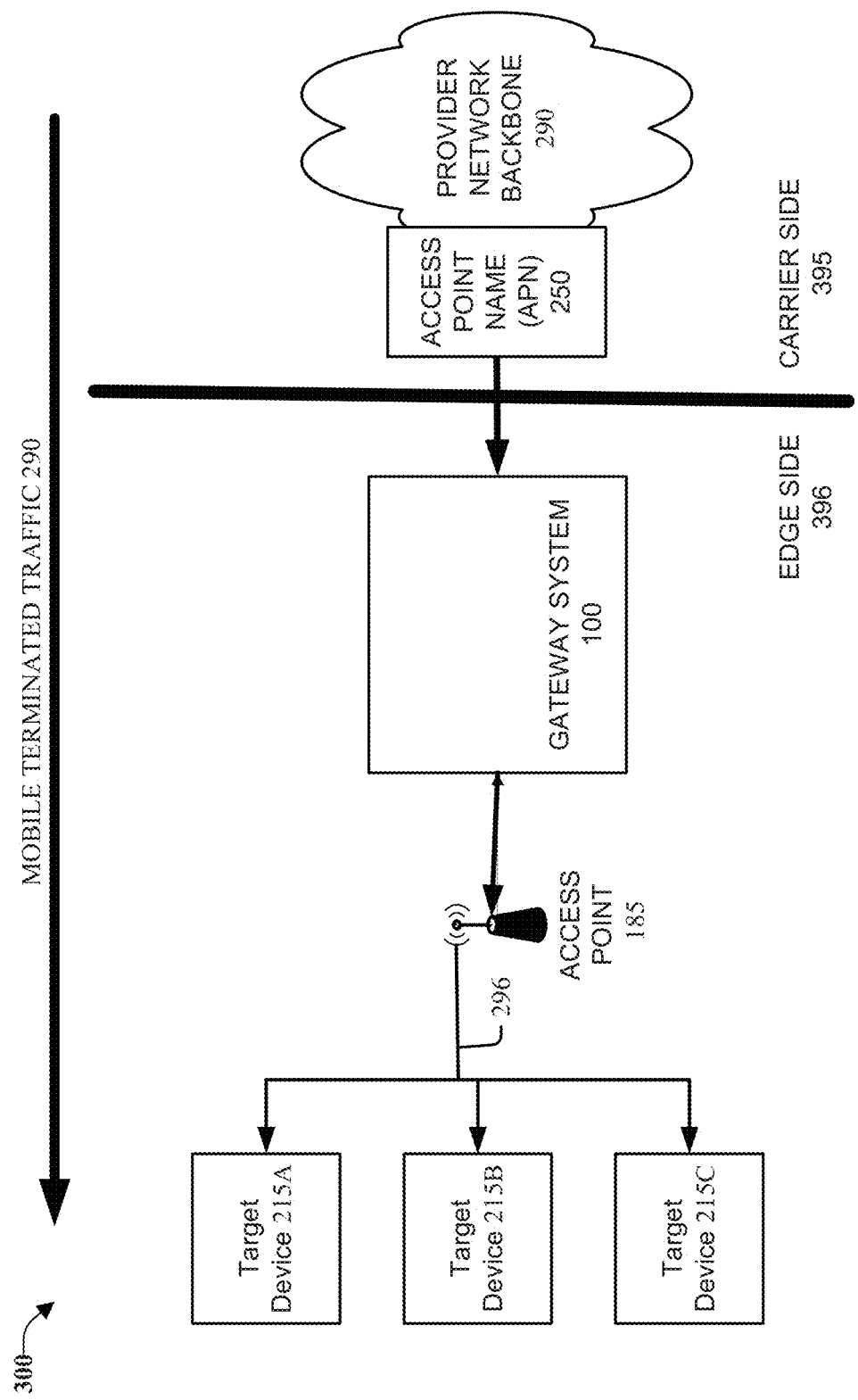
FIG. 3 illustrates a block diagram of an example, non-limiting system that can facilitate providing a gateway for publicly accessible communications to reach devices via a wireless network, in accordance with one or more embodiments described herein.

FIG. 3 illustrates a block diagram of an example, non-limiting system 300 that can facilitate providing a gateway for publicly accessible communications to reach devices via a wireless network, in accordance with one or more embodiments described herein. Repetitive description of like elements and/or processes employed in respective embodiments is omitted for sake of brevity. In some embodiments, system 300 can comprise gateway system 100, APN 250, access point 185, and target devices 215A-C. APN 250 is depicted on a carrier side 395 for components and gateway system 100 is depicted as an edge side 396 component, deployed between access point 185 and APN 250.

As noted with the discussion of FIG. 2 above, in contrast to system 200 of FIG. 2, FIG. 3 depicts embodiments where gateway system 100 is deployed on edge side 396, receiving communications from APN 250, analyzing the communications and sending the communications to target devices 215A-C if this action is selected. One type of network communication that can benefit from this placement is a peer-to-peer (also termed edge-to-edge) communication, such as vehicle to vehicle (V2V) communication in NR configurations, e.g., for communications that are relayed through APN 250, gateway system 100 can analyze these messages.

Figure 4:
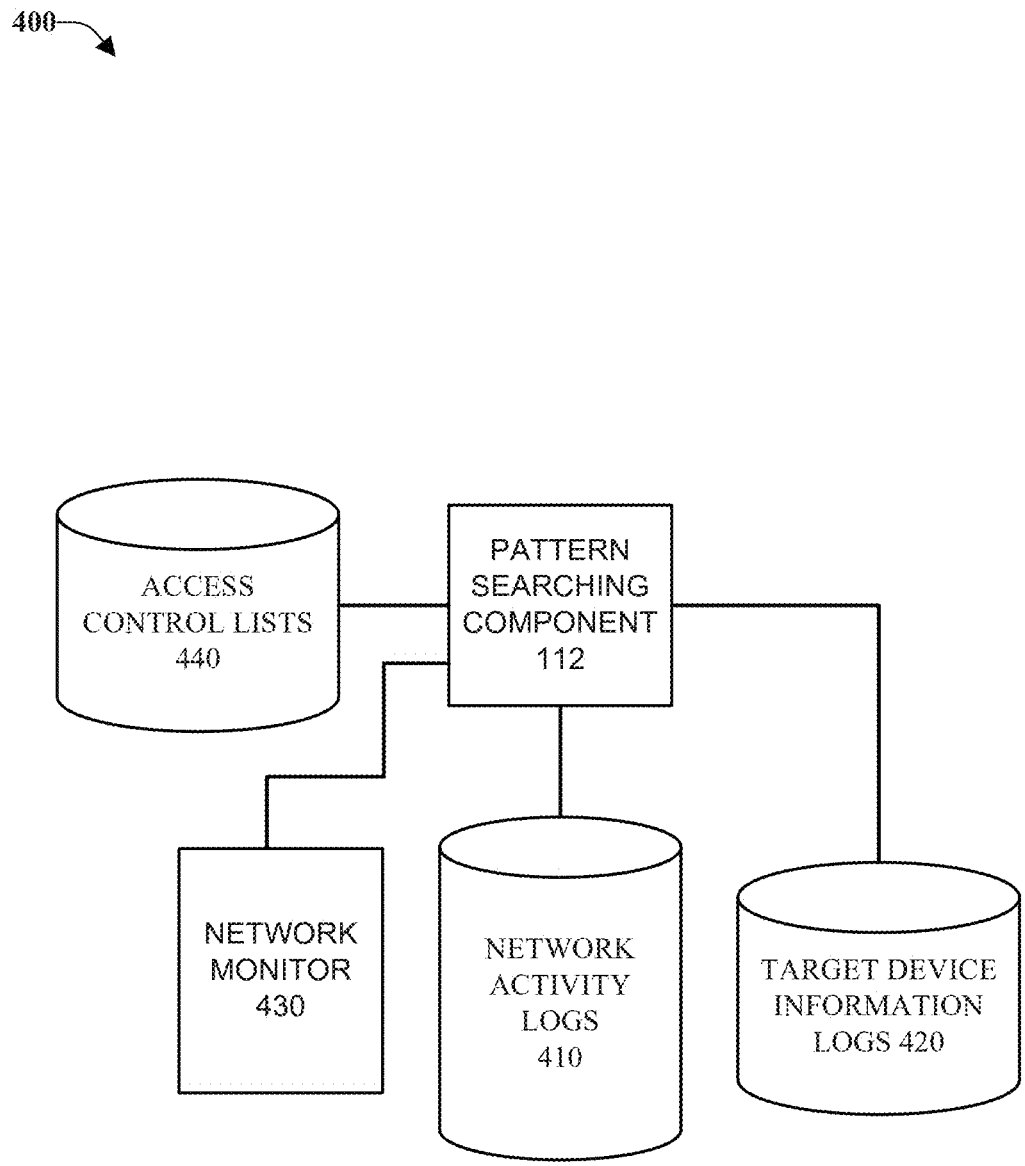
FIG. 4 illustrates a block diagram of an example, non-limiting system that can facilitate providing a gateway for publicly accessible communications to reach devices via a wireless network, in accordance with one or more embodiments described herein.

FIG. 4 illustrates a block diagram of an example, non-limiting system 400 that can facilitate providing a gateway for publicly accessible communications to reach devices via a wireless network, in accordance with one or more embodiments described herein. Repetitive description of like elements and/or processes employed in respective embodiments is omitted for sake of brevity.

In one or more embodiments, system 400 can include access pattern searching component 112, which can analyze data from different combinations of system data to identify anomalous conditions associated with communications, e.g., communications terminating with target devices 215A-C. Example data that can be analyzed by one or more embodiments include, but are not limited to access control lists 440, data from network monitor 430, network activity logs 410, and target device information logs 420.

Generally speaking, one or more embodiments can, over time develop a pattern of activity for entities including, but not limited to, individual devices, types of devices, users, types of users, and other similar entities. Developed patterns can be updated according to usage, improvements in pattern development, for example. Once developed, gateway system can utilize different live and archival data sources to identify anomalous activity.

Example data points that can be collected and used by one or more embodiments to identify anomalous activity include, but are not limited to, packet rates, packet sizes, frequency of transmissions, moving or static cell locations, inbound (e.g., MT) and outbound (e.g., mobile originated (MO)) access and usage patterns. In an example, a pattern of use for originating device 210A indicates that the device infrequently attempts access to the IoT device for reports or updating configuration settings. When the usage activity for this the originating device 210A changes to frequent access from a different IP address or a different IP address area, this could be highlighted as anomalous activity.

One having skill in the relevant art(s), given the description herein, would appreciate that other data sources, activities, parts of the network, and other similar entities can also be used by one or more embodiments. It should be noted that, FIG. 5 below discusses different AI/ML components of one or more embodiments that can also be employed for detecting anomalous activities and other functions.

Figure 5:
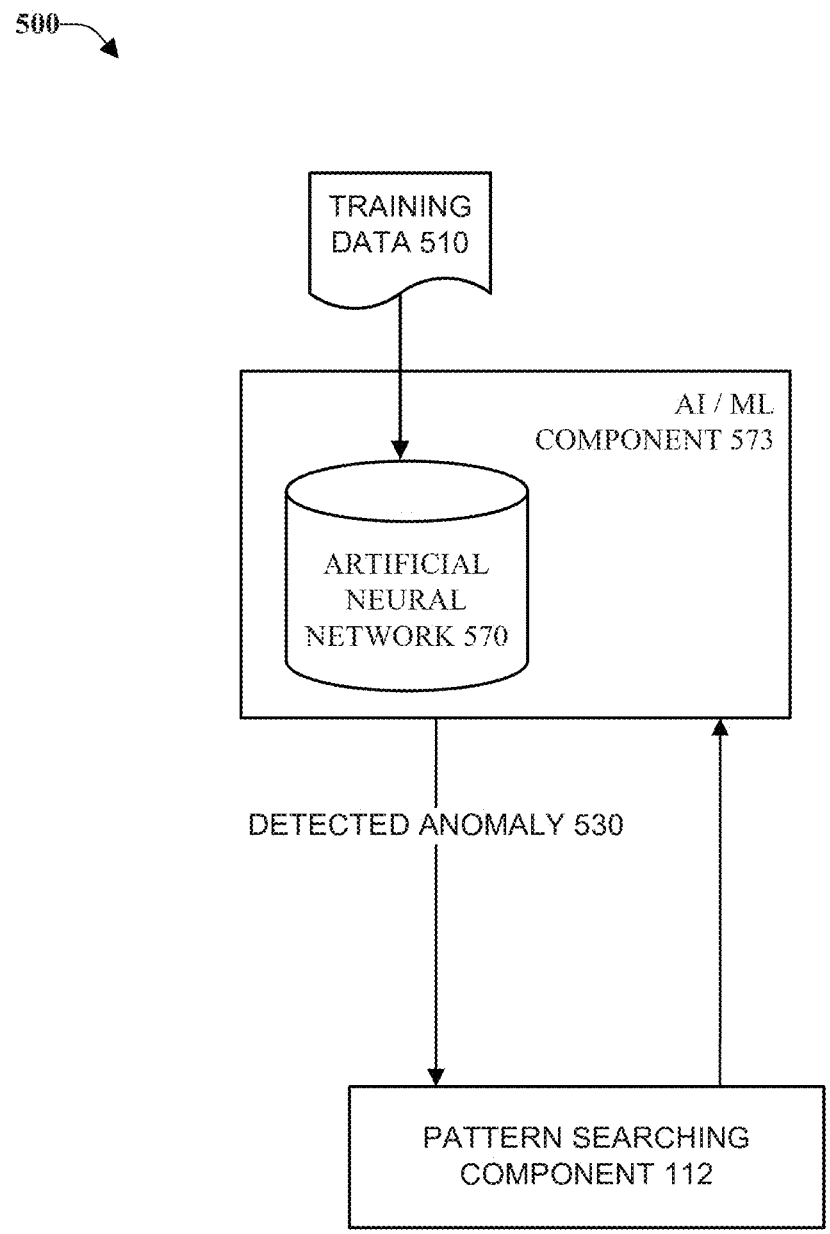
FIG. 5 illustrates an implementation of an example of non-limiting system that can facilitate providing a gateway for publicly accessible communications to reach devices via a wireless network by employing artificial intelligence and machine learning (AI/ML) components, in accordance with one or more embodiments described herein.

FIG. 5 illustrates an implementation of an example 500 of non-limiting system 500 that can facilitate providing a gateway for publicly accessible communications to reach devices via a wireless network by employing AI/ML components, in accordance with one or more embodiments described herein. Repetitive description of like elements employed in other embodiments described herein is omitted for sake of brevity. As depicted in FIG. 5, system 500 can comprise artificial neural network (ANN) 570, and training data 510, and AI/ML component 573 communicatively coupled to pattern searching component 112.

In certain embodiments, different functions of AI/ML can be facilitated based on classifications, correlations, inferences and/or expressions associated with principles of artificial intelligence. For example, AI/ML component 573 can employ expert systems, fuzzy logic, support vector machines (SVMs), hidden Markov models (HMMs), greedy search algorithms, rule-based systems, Bayesian models (e.g., Bayesian networks), ANNs, other non-linear training techniques, data fusion, utility-based analytical systems, systems employing Bayesian models, and ensemble ML algorithms/methods, including deep neural networks, reinforcement learning (RL), Bayesian Statistics, and long short-term memory (LSTM) networks.

In an example AI/ML approach that can be utilized by one or more embodiments, ANN 570 can be optimized (also termed "trained" herein) by submitting optimizing data (e.g., training data 510) to ANN 570, e.g., network traffic data and other data used for identification of communication anomalies, e.g., detected anomaly 530. It should be noted that this description of employing ANN 570 is non-limiting, e.g., one or more embodiments can use other types of machine learning algorithms that receive input and perform analysis. Another example implementation of AI/ML components can employ a Bayes Network or Markov network that can model elements including, but not limited to, network elements and a distributed network of models. A network dependency graph could be built that models the network and physical and virtual or separate and the dependencies between graph nodes. One having skill in the relevant art(s), given the description herein, would appreciate other areas where AI/ML component 573 can be employed by one or more embodiments.

As used herein, the term "neural network model" can refer to a computer model that can be used to facilitate one or more machine learning tasks, wherein the computer model can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). Neural network models can learn through training, wherein data with known outcomes is inputted into the computer model, outputs regarding the data are compared to the known outcomes, and/or the weights of the computer model are autonomous adjusted based on the comparison to replicate the known outcomes. As used herein, the term "training data" can refer to data and/or data sets used to train one or more neural network models. As a neural network model trains (e.g., utilizes more training data), the computer model can become increasingly accurate; thus, trained neural network models can accurately analyze data with unknown outcomes, based on lessons learning from training data, to facilitate one or more machine learning tasks.

Figure 6:
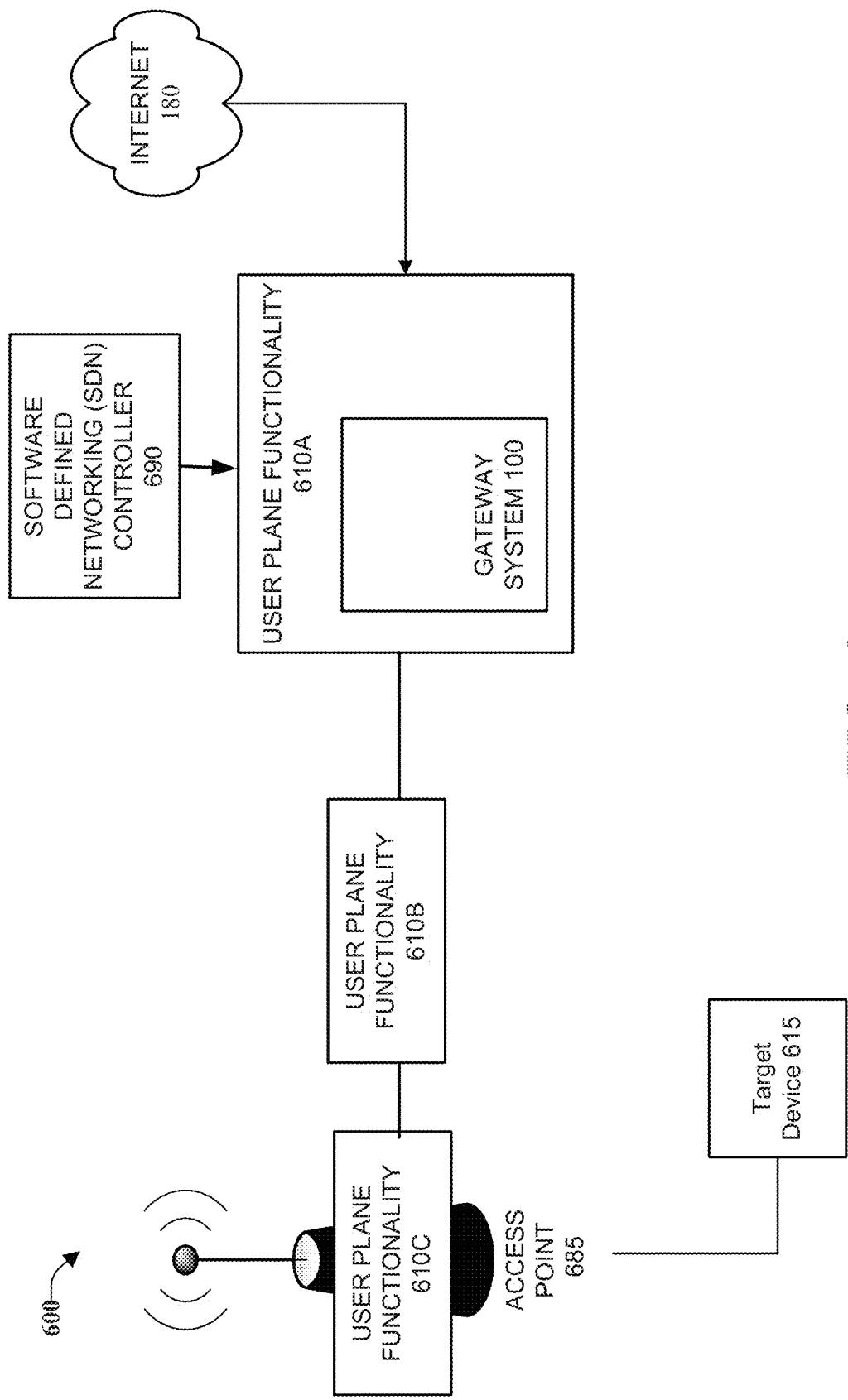
FIG. 6. illustrates an implementation of an example of non-limiting system that can facilitate providing a gateway for publicly accessible communications to reach devices via a connectionless wireless network, in accordance with one or more embodiments described herein.

FIG. 6. illustrates an implementation of an example of non-limiting system 600 that can facilitate providing a gateway for publicly accessible communications to reach devices via a connectionless wireless network, in accordance with one or more embodiments described herein. Repetitive description of like elements employed in other embodiments described herein is omitted for sake of brevity. System 600 can include user plane functionalities (UPFs) 610A-C, access point 685, target device 650, software-defined networking (SDN) controller, and internet 180, in accordance with one or more embodiments. In one or more embodiments, UPF 610A contains the gateway 100 component, and UPF 610C is operated at access point 685.

In some implementations of one or more embodiments, to support large amounts of IoT devices, instead of a connection-oriented architecture that sets up a general packet radio service tunneling protocol (GTP) before any data path communications, one or more embodiments can be implemented in a connectionless architecture using SDN principles combined with IP-based direct user data packet forwarding. SDN can be used as a control plane protocol for packet forwarding configurations, and for flexible service edge configurations (e.g., via a segment routing header (SRH) configuration). In one or more embodiments, this connectionless architecture can be implemented at many levels, including but not limited to in both the RAN and Core.

Within a 5G core network, multiple UPFs can be concatenated (e.g., UPFs 610A-C). At the mobile edge, a centralized user-user plane CU-UP can be integrated with UPF 610A, wherein the UPF 610B and UPF 610C are more centralized in the core network. In another scenario, within a 5G network, different slices can be used to accommodate the needs of a variety of types of devices, services and applications with dramatically different service delivery and mobility requirements (e.g., use different network slices for connectionless vs. connection-oriented architecture).

In this implementation, SDN controller 690 can dynamically configure one or more virtual network functions (VNFs) for packets to be relayed to target device 615 from internet 180. In one or more embodiments, packets arriving at gateway system 100 can have a segment routing header appended to them, including routing information, and VNFs configured by SDN controller 690 to utilize functions of gateway system 100, e.g., real-time network traffic analysis and various security functions. For one or more embodiments, VNFs can be dynamically configured to be provided by gateway system 100 to provide many of the services described above, e.g., encryption, access control lists, and other functions that may not be available in the IoT device. In an example, SDN controller 690 configures an example V1 VNF for V1 for intrusion prevention and detection system (IDS/IPS), and V2 for multi-factor access control. These codes can be added to the SRH for performance with certain packets received.

Figure 7:
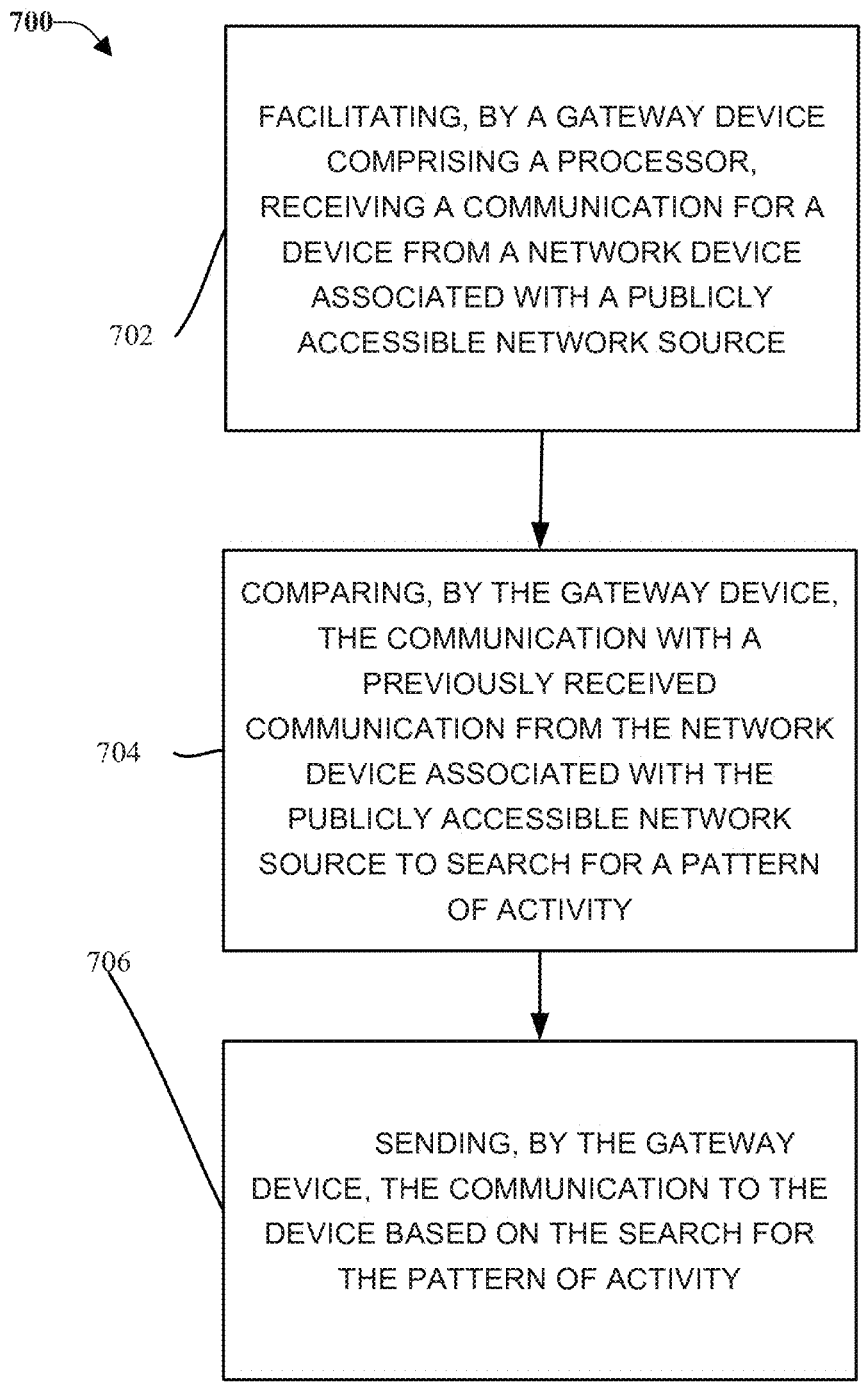
FIG. 7 depicts a flow diagram representing example operations of a user equipment (UE) device, in accordance with various aspects and implementations of the subject disclosure.

FIG. 7 depicts a flow diagram representing example method 700, in accordance with various aspects and implementations of the subject disclosure. It should be noted that, one or more aspects, (e.g., implemented in a machine-readable storage medium, comprising executable instructions that, when executed by a processor, facilitate performance of operations) can be represented in FIG. 7.

At 702, method 700 can comprise facilitating, by a gateway device comprising a processor, receiving a communication for a device from a network device associated with a publicly accessible network source. For example, in one or more embodiments, method 700 can comprise facilitating, by gateway system 100 comprising processor 160, receiving a communication for target device 215A from originating device 210A associated with internet 180.

At 704, method 700 can comprise facilitating comparing, by pattern searching component 112 of the gateway device, the communication with a previously received communication from the network device associated with the publicly accessible network source to search for a pattern of activity. For example, in one or more embodiments, method 700 can comprise facilitating comparing, by the gateway device, the communication with a previously received communication (e.g., retrieve from network activity logs 410) from originating device 210A associated with the publicly accessible network source to search for a pattern of activity. At 706, method 700 can comprise facilitating sending, by the gateway device, the communication to the device based on the search for the pattern of activity. For example, in one or more embodiments, method 700 can comprise facilitating sending, by the gateway device, the communication to target device 215A based on the search for the pattern of activity.

Figure 8:
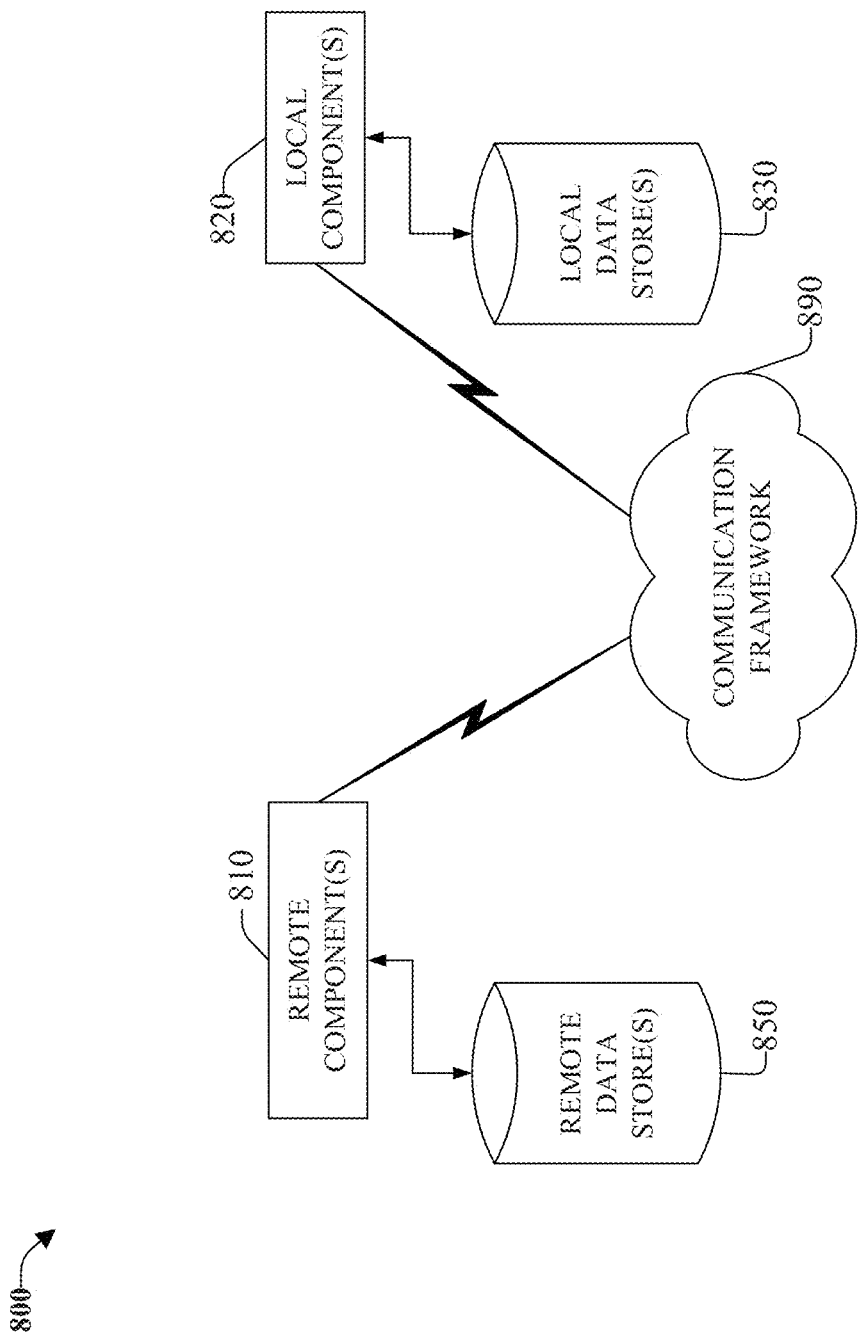
FIG. 8 is a schematic block diagram of a computing environment with which the disclosed subject matter can interact, in accordance with one or more embodiments described herein.

FIG. 8 is a schematic block diagram of a computing environment 800 with which the disclosed subject matter can interact. The system 800 comprises one or more remote component(s) 810. The remote component(s) 810 can be hardware and/or software (e.g., threads, processes, computing devices). One possible communication between a remote component(s) 810 and a local component(s) 820 can be in the form of a data packet adapted to be transmitted between two or more computer processes. Another possible communication between a remote component(s) 810 and a local component(s) 820 can be in the form of circuit-switched data adapted to be transmitted between two or more computer processes in radio time slots. The system 800 comprises a communication framework 890 that can be employed to facilitate communications between the remote component(s) 810 and the local component(s) 820, and can comprise an air interface, e.g., Uu interface of a UMTS network, via a long-term evolution (LTE) network, via a 5G network, etc. Remote component(s) 810 can be operably connected to one or more remote data store(s) 850, such as a hard drive, solid state drive, SIM card, device memory, etc., that can be employed to store information on the remote component(s) 810 side of communication framework 890.

Figure 9:
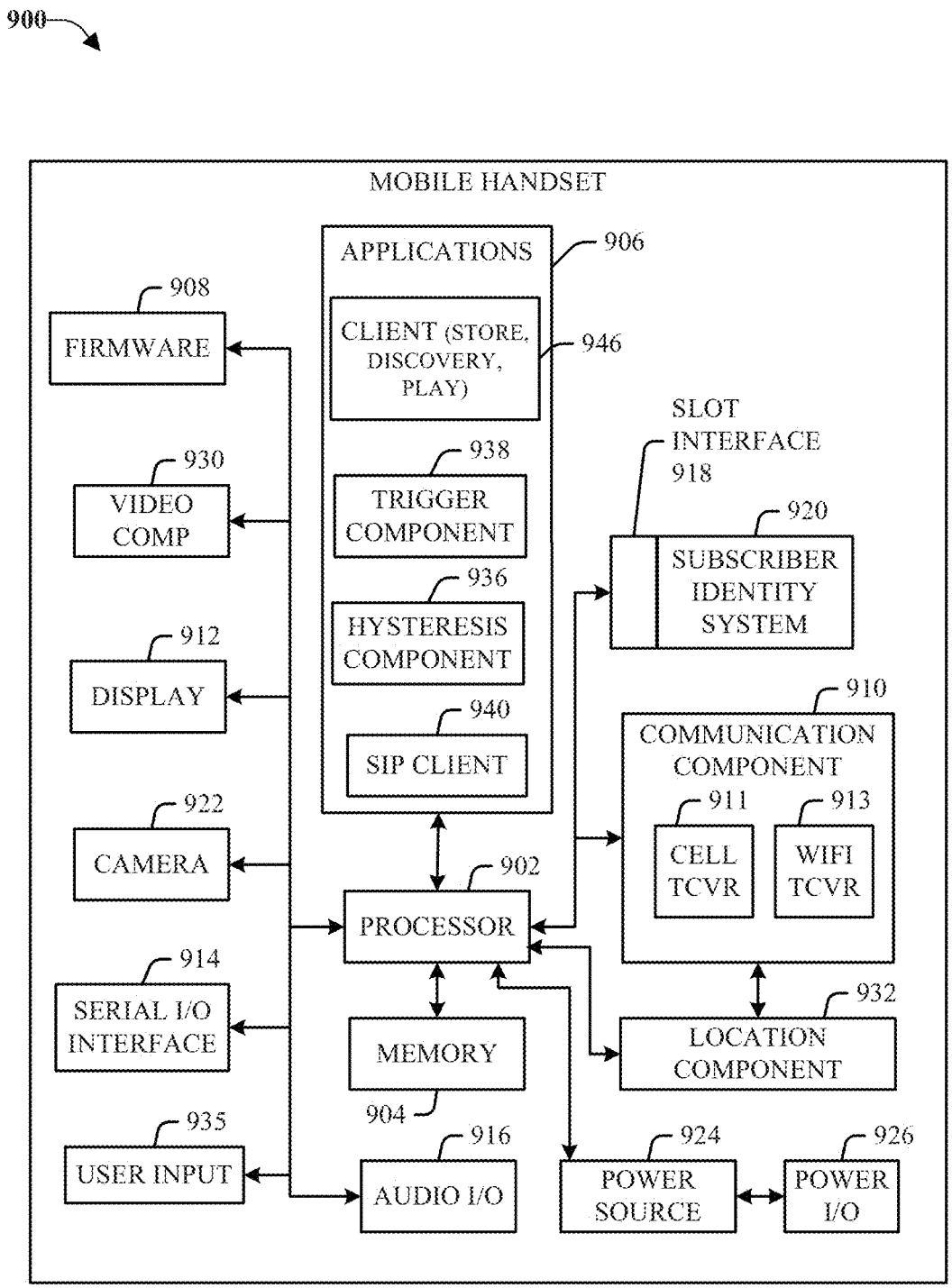
FIG. 9 is a block diagram of an example mobile handset operable to engage in a system architecture that facilitates wireless communications according to one or more embodiments described herein.
Figure 10:
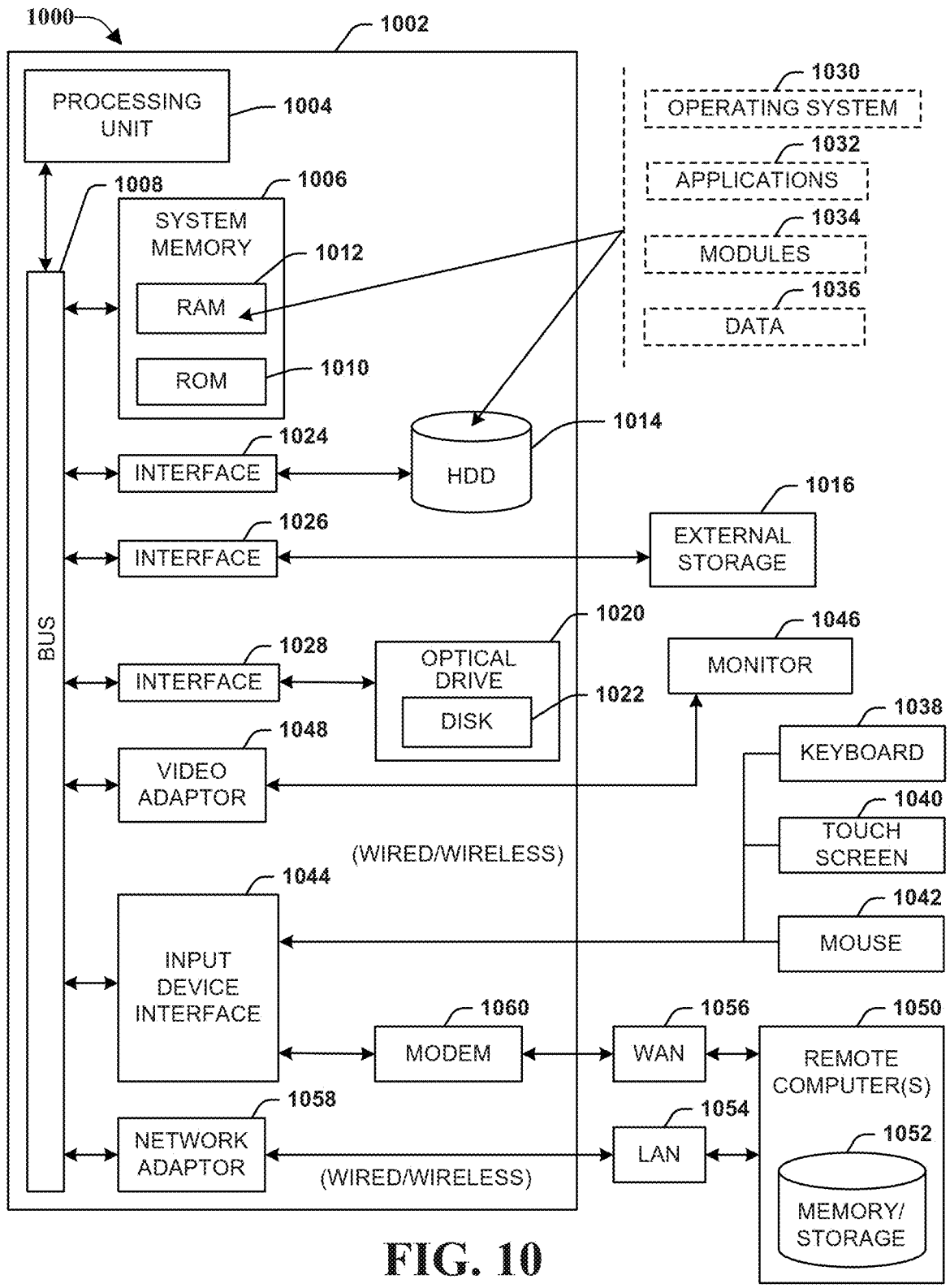
FIG. 10 illustrates a suitable computing environment in which the various aspects of this disclosure can be implemented, in accordance with various aspects and implementations of the subject disclosure.

In order to provide a context for the various aspects of the disclosed subject matter, FIGS. 9 and 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 9 is an example block diagram of an example mobile handset 900 operable to engage in a system architecture that facilitates wireless communications according to one or more embodiments described herein. Mobile handset 900 is one example target device 210A-C illustrated in FIG. 1. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. User equipments do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used, or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather are to be construed in breadth, spirit and scope in accordance with the appended claims.

What is claimed is:

1. A method, comprising:
facilitating, by gateway equipment comprising a processor, receiving a communication for first network equipment from second network equipment associated with a publicly accessible network source;
identifying, by the gateway equipment, the first network equipment;
determining, by the gateway equipment, based on the identifying of the first network equipment, functional capabilities of the first network equipment;
comparing, by the gateway equipment, content of the communication with previous content of a previously received communication from the second network equipment to search for a pattern of activity applicable to determine an anomalous characteristic of a transmission of the communication, wherein the content comprises operation content representative of operations performed by the second network equipment related to the communication;
sending, by the gateway equipment, the communication to the first network equipment based on the search for the pattern of activity; and
based on a supplementing of the functional capabilities of the first network equipment, facilitating, by the gateway equipment, enabling a function for the first network equipment, wherein the function enabled for the first network equipment comprises an authentication for access, by the publicly accessible network source, to settings of the first network equipment.

2. The method of claim 1, wherein the sending of the communication to the first network equipment comprises sending the communication to the first network equipment via an access point name.

3. The method of claim 1, wherein the facilitating of the receiving of the communication comprises facilitating the receiving of the communication via an access point name.

4. The method of claim 1, wherein the publicly accessible network source comprises a publicly accessible wide area network.

5. The method of claim 1, wherein the communication comprises a mobile terminated message, and wherein the sending of the communication to the first network equipment comprises sending the communication to the first network equipment via wireless network equipment of a wireless network.

6. The method of claim 1, wherein the comparing of the content of the communication with the previous content of the previously received communication comprises applying a machine learning data structure to the communication to identify the pattern of activity, and wherein the machine learning data structure is configured based on the previously received communication.

7. The method of claim 6, wherein the machine learning data structure comprises a neural network trained based on the previously received communication.

8. The method of claim 1, wherein the functional capabilities of the first network equipment exclude encryption of a communication from the first network equipment and decryption of the communication to the first network equipment, and wherein the function enabled for the first network equipment comprises the encryption of the communication from the first network equipment and the decryption of the communication to the first network equipment.

9. A device, comprising:
a processor; and
a memory that stores executable instructions that, when executed by the processor, facilitate performance of operations, comprising:
establishing a wireless connection to a wireless network; and
receiving, via the wireless connection, content data from a gateway device, that has been communicated via a network device of a publicly accessible network, wherein the content data has been compared, by the gateway device, to a template of anomalous activity applicable to determine an anomalous characteristic of a transmission of the content data, and wherein the content data comprises operation data indicative of operations performed by the network device related to the content data;
receiving an indication that the gateway device provided a function to the device based on:
identifying the device;
determining, based on the identifying the device, functional capabilities of the device, and
supplementing the functional capabilities of the device, wherein the function provided to the device comprises an authentication for access, by the publicly accessible network, to settings of the device.

10. The device of claim 9, wherein the receiving of the content data from the gateway device comprises receiving the content data from the gateway device via an access point name.

11. The device of claim 9, wherein the gateway device received the content data via an access point name from the network device of the publicly accessible network.

12. The device of claim 9, wherein the content data comprises a mobile terminated message.

13. The device of claim 9, wherein the content data has been previously compared to the template of anomalous activity by applying a neural network that has been trained based on communications handled by the gateway device.

14. The device of claim 9, wherein the anomalous characteristic comprises an anomalous packet characteristic.

15. The device of claim 9, wherein the anomalous characteristic comprises an anomalous frequency of transmissions comprising the transmission of the data.

16. The device of claim 9, wherein the operations further comprise, receiving, via the wireless connection, encrypted content data from the gateway device, and wherein the gateway device encrypted the content data based on a determination that the device does not components to encrypt the content data.

17. A non-transitory machine-readable medium, comprising executable instructions that, when executed by a processor of a gateway device, facilitate performance of operations, comprising:

receiving a communication for user equipment via a network;

identifying the user equipment;

determining, based on identifying the user equipment, functional capabilities of the user equipment;

comparing content of the communication to a template of anomalous activity applicable to determine an anomalous characteristic of the content of the communication, wherein the content comprises information that indicates operations that were performed by access point equipment related to the communication for the user equipment;

sending the communication to the device user equipment based on the comparing of the communication to the template; and enabling an authentication for access to settings of the user equipment based on a supplementing of the functional capabilities of the user equipment.

18. The non-transitory machine-readable medium of claim 17, wherein the anomalous characteristic comprises an anomalous packet characteristic.

19. The non-transitory machine-readable medium of claim 17, wherein the sending of the communication to the user equipment comprises sending the communication to the user equipment via an access point name.

20. The non-transitory machine-readable medium of claim 17, wherein the receiving of the communication comprises the receiving of the communication via an access point name.

* * * * *